United States Patent

Smith et al.

[15] 3,684,875
[45] Aug. 15, 1972

[54] ANALOG-TO-DIGITAL MEASURING APPARATUS

[72] Inventors: James E. Smith; Victor E. Borgogno, both of Longmont; Robert E. Luehr, Lafayette, all of Colo.

[73] Assignee: Wm. Ainsworth Inc., Denver, Colo.

[22] Filed: Sept. 28, 1970

[21] Appl. No.: 75,981

[52] U.S. Cl. ............... 235/151.33, 177/25, 177/210, 235/92 WT
[51] Int. Cl. ......................... G06f 15/20, G06f 7/385
[58] Field of Search ........ 235/151.31, 151.33, 92 WT; 177/25, 210, 213; 340/347 AD

[56] References Cited

UNITED STATES PATENTS 2,974,863   3/1961   Williams et al. ....... 235/151.33
3,375,357   3/1968   Dekker et al. ........ 235/151.33 X
3,565,194   2/1971   Engle et al. ........... 177/210 X

*Primary Examiner*—Eugene G. Botz
*Assistant Examiner*—R. Stephen Dildine, Jr.
*Attorney*—Reilly and Lewis

[57] ABSTRACT

In an electronic digital-reading balance, electronic circuitry is provided for automatically deducting tare weight from the weight of an object being weighed wherein a latch circuit stores the digital reading of the tare weight, and a comparator in cooperation with display circuitry is capable of generating and displaying as a digital readout a value equal to the gross weight of the object being weighed less the tare weight stored in the latching circuitry. Although specifically adaptable for use in deducting tare or other given weights in a weigh balance apparatus, the same or similar circuitry has useful application to other analog-to-digital measuring and counting devices.

15 Claims, 6 Drawing Figures

PATENTED AUG 15 1972 3,684,875

INVENTORS
JAMES E. SMITH
VICTOR F. BORGOGNO
ROBERT E. LUEHR
BY
*Reilly and Lewis*
ATTORNEYS

ANALOG-TO-DIGITAL MEASURING APPARATUS

The present invention relates to measuring apparatus of the type adaptable for converting analog input information into digital form, and more particularly relates to an improved form of measuring apparatus which is capable of automatically deducting or subtracting values of selected prior digital output signals representative of a given input value from subsequent digital readings and has particular utility in digital weigh balance apparatus.

The features and advantages of the present invention are best exemplified by reference to its use in connection with the measurement of weight. For example in weighing objects or substances on a balance, it is often desirable to be able to deduct a portion of the weight placed on the balance pan in order to obtain the true weight of the object being weighed. For example, in weighing a liquid, it is desirable to deduce from the total weight measured the weight of the container, this weight being defined as the tare weight.

In modern electronic weigh balance apparatus, it is customary to employ a balance beam with weigh pan supported on one arm and an electromagnetic null-restoring device attached to the opposite arm, electronic circuitry to sense any displacement of the beam from the null position and to generate a circuit current just sufficient to restore the beam to the null position by the electromagnet, and an analog-to-digital converter, or digital voltmeter, that samples the coil current passing through the electromagnet and generates a corresponding digital display in units of weight. A representative digital electronic weigh balance apparatus is set forth and described in copending application for Automatic Top-Loading Weigh Apparatus With Electronic Measuring And Recording Circuit, filed Aug. 15, 1969, Ser. No. 850,397 and assigned to the assignee of this invention. In the copending application, a null-restoring device consists of a stationary coil situated within the magnetic field of a permanent magnet that is attached to the balance beam. The beam mechanism, the null-restoring device, and the sensing and current generating circuits are so designed that the coil current required to restore the beam to the null position is exactly proportional to any force or weight tending to displace the beam and accordingly the coil current is a direct analog of the force applied to the pan. The analog signal generated is then converted to digital form by a digital voltmeter which is capable of displaying the weight measured in numerical form.

In the foregoing, in order to deduct the tare weight from the total weight measured, the usual practice has been to manually adjust a potentiometer so that the net voltage sensed by the digital voltmeter was reduced to be proportional to the net weight of the matter weighed by the balance. Thus the tare adjustment was made by first placing the empty container on the balance and manually adjusting the potentiometer until the net voltage across a reference resistor was reduced to zero and the digital voltmeter indicated a zero readout. The liquid or solid matter to be weighed was then placed in the container and the net weight value read or recorded. The same procedure was necessarily followed in reading a succession of weights to be placed on the weigh balance in that it was necessary either to record the tare weight and reduce the readout to zero or to remove from the balance any weight or matter other than the specific object to be weighed. Accordingly, the procedure in adjusting for tare weight or removal of other weight in weighing a succession of objects has been unduly time-consuming and has limited the number of weighings which could be made over a predetermined time interval. Moreover, the possibility of operator error was introduced into each weighing, if the potentiometer was not accurately adjusted for the tare weight.

Accordingly, it is an object of the present invention to provide a novel and improved digital measuring apparatus for deducting from subsequent digital outputs the value of selected prior outputs including outputs resulting from input signals or unwanted error signals caused by mechanical or electrical system drift.

It is another object of the present invention to provide for a novel and improved digital weigh balance apparatus including automatic tare compensating circuitry which is capable of automatically deducting prior weighings, or tare, in a rapid, accurate manner.

It is a further object of the present invention to provide for a novel and improved digital balance apparatus incorporating novel circuitry therein for automatically or selectively deducting prior readings or measurements and specifically in apparatus of the type capable of converting analog input signals into digital information wherein the value of selected prior output signals may be automatically deducted from subsequent digital readings in making cumulative or successive measurements.

It is an additional object of the present invention to provide in a digital voltmeter circuit for electronic weigh balance apparatus having an automatic tare or weight compensating circuit in which a time base counter is employed with an integrator in the measurement of the integrated value of the weight measured for selective loading into a storage register, and a comparator circuit automatically deducts the value stored from a new value or weight to be measured so that the display circuit of the digital voltmeter will display only the net weight of the object weighed; and further wherein gating means is provided to selectively permit new tare values to be stored in the tare compensating circuit in a rapid, dependable manner.

The preferred form of the present invention is hereinafter set forth in association with a digital weigh balance apparatus having a beam balance, means for generating an electrical current in response to an unbalanced condition caused by weight placed on the balance beam, restoring means that are responsive to the electrical current generated to restore the beam to its balanced position, and a reference resistor which generates a voltage signal representative of the weight on the balance in response to the generated current. The voltage signal developed is converted by means of a digital voltmeter circuit through an integrator circuit whose function is to generate a time interval proportional to the voltage and the time interval is measured by a constant-frequency clock circuit or other timing device which through a counter will contain a number that is directly proportional to the time interval and therefore to the voltage level. The number contained or developed in the counter is read and held by a display circuit and may be suitably displayed by means of "Nixie" tubes. In accordance with the present invention, whenever a given weight, such as, the tare weight, has been measured and recorded in the digital voltmeter circuit and is to be deducted from a subsequent measurement, the number loaded into the time base counter is stored in a tare latch circuit and a comparator circuit compares the number stored in the tare latch circuit with the constantly changing number being loaded into the time-base counter from the subsequent measurement or reading until the time-base counter reaches the number stored in the tare latch. At this point the comparator generates a pulse which activates the display counter to start counting upward from zero as the time-base counter continues to count upward from the number or value stored in the tare latch. Thus the count in the display counter will lag behind the time-base counter by a number equal to the tare value or number stored in the tare latch circuit. At the end of the given time interval proportional to the magnitude of the voltage level, as sensed by the integrator circuit, the integrator will generate a transfer pulse in order to load the numerical count then in the display counter into a display latch for readout through the display circuit of the digital voltmeter. Accordingly, the number finally displayed will represent the gross weight less tare or the true net weight of the object being measured.

The tare compensating circuit as described is selectively actuated by a switch in order to store the appropriate or desired number in the counter in the tare latch or storage register. Moreover, in order to store a new value of tare in the tare latch, the switch is closed to open the normally closed gating circuit prior to and throughout the weighing of a new tare weight placed on the weigh pan; with the gating circuit open over the entire measurement cycle, the transfer pulse generated by the integrator at the end of the time interval will enable the tare latch to read and store the new number loaded into the time-base counter; and since the new number stored in the tare latch is then the same as the total weight being measured, the digital readout in the display circuit will drop to zero on the next measurement cycle and remain there until the weight of the pan is changed. The measuring apparatus of the present invention is capable of automatically deducting tare weights from the weight of an object to be measured an is further capable of permitting successive weighing of objects placed on the scale without removal of objects already placed on the scale simply by establishing the new tare value to each measurement or weighing operation in succession.

The above and other objects, advantages and features of the present invention will become more readily understood and appreciated from a consideration of the following detailed description of a preferred form thereof when taken together with the accompanying drawings, in which.

Figure 1:
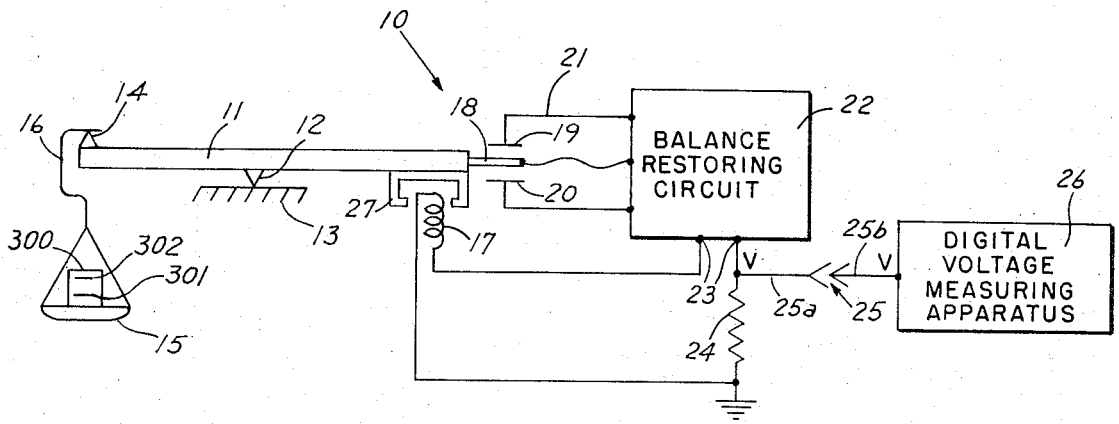
FIG. 1 is a diagrammatic view of a preferred form of a digital weigh balance according to the present invention.

Referring to the drawings in more detail, there is shown by way of illustrative example in FIG. 1, a digital weigh balance apparatus generally designated at 10. As represented, the balance 10 has a balance beam 11 mounted on a downwardly projecting knife edge 12 to pivot on a fixed support structure 13. On the upper lefthand side end of the beam 11, as shown in FIG. 1, is mounted an upwardly projecting knife edge 14. A balance pan 15 is hung by means of a rigid hook-shaped suspension member 16 on the knife edge 14 to extend below the beam 11. That portion of the hook-shaped member 16 resting on the knife edge 14 is substantially straight.

Mounted on the underside of the other end of the beam 11 is a magnet represented at 27. A forcer coil 17 is associated with the magnet 27 and is fixed in position so that by running DC of the appropriate sign through the coil 17 the magnet 27 may be drawn towards the coil 17, thereby to restore the beam to a balanced or null position after weight has been placed on the pan 15.

Arranged to extend horizontally from the magnet end of the beam 11 is a capacitor plate 18 forming a part of a differential capacitor system above and below the plate 18 which includes fixed capacitor plates 19 and 20, respectively. Electrical leads 21 are connected from the capacitor plate 18–20 to the balance restoring circuit 22. The balance restoring circuit 22, as is hereinafter discussed, generates a DC flow between its output terminals 23 which is proportional to the weight placed in the balance pan 15. Connected in series between the terminals 23 for receiving DC from the restoring circuit 22 are a reference resistor 24 and the restoring coil 17. As shown in FIG. 1, the analog signal or voltage generated across the resistor 24 is designated V. In the digital balance 10, this voltage V represents and is proportional to weight placed on the balance pan 15, and is transmitted to the voltage measuring apparatus 26 through the terminal 25.

As a setting for the present invention, a conventional form of digital voltage measuring apparatus will be hereinafter described and specifically its function in converting analog signals representative of the weight placed on the scale to a digital reading. Specifically, reference is made to a Digital Voltmeter unit manufactured and sold by Xtron Corporation of Denver, Colorado, under Model 4/5DUI, wherein the voltage delivered across the terminal 25 is applied to an integrator circuit which functions in a well-known manner to generate a voltage ramp with a slope proportional to the magnitude of the input voltage. Specifically, an interval begins when the integrator control circuitry receives a pulse $T_o$ from a time-base counter and ends at a time $T_1$ when the integrator output reaches the threshold of a level detector. To mark the end of the interval of time, the level detector will generate an output pulse $T_1$ and the time interval generated will determine the number that the voltmeter will display for a given weight on the weigh balance. In order to convert the analog information to numerical information a constant-frequency clock generates timing pulses and a time-base counter operates continuously to count the constantly recurring timing pulses delivered from the clock from zero to the maximum count of the counter and again return to zero. Each time the counter returns to zero it will generate a pulse $T_o$ representing the zero count in the counter as well as zero time for the integrator and thus marks the beginning of each measurement cycle.

When triggered by the $T_o$ pulse, the integrator measures an interval of time that is proportional to the voltage applied thereto and generates a pulse $T_1$ at the end of this time interval. In the meantime, the time-base counter will count upwardly from zero at a constant rate. At time $T_1$, the counter will contain a number that is directly proportional to the time interval that has lapsed since $T_o$ and which number is the desired readout value. A display latch is also utilized to read and hold the number in the counter at time $T_1$ and to present that number continuously to a display circuit. Here the pulse generated by the integrator at time $T_1$ is applied to the display latch as a transfer pulse causing the latch to read and store the number in the counter at the instants the pulse $T_1$ occurs, without interfering with the operation of the counter itself. The latch will store the number applied from the counter until the next time the transfer pulse occurs and also presents the stored number continuously through the display circuit which displays the number by means of "nixie" tubes. A new measurement cycle is initiated each time the counter returns to zero and the action hereinabove described is repeated, the duration of each measurement cycle being on the order of one-third second.

In order to compensate for tare in a weigh balance incorporating the digital voltmeter circuitry of the type hereinbefore described, it has been customary to alter the input voltage to the integrator by an amount proportional to the tare to be deducted, this being accomplished by applying to the integrator a current that opposes the current to be measured so that the net current applied to the integrator circuit is actually the difference between the two currents and the numerical value displayed is proportional to this difference.

Figure 2:
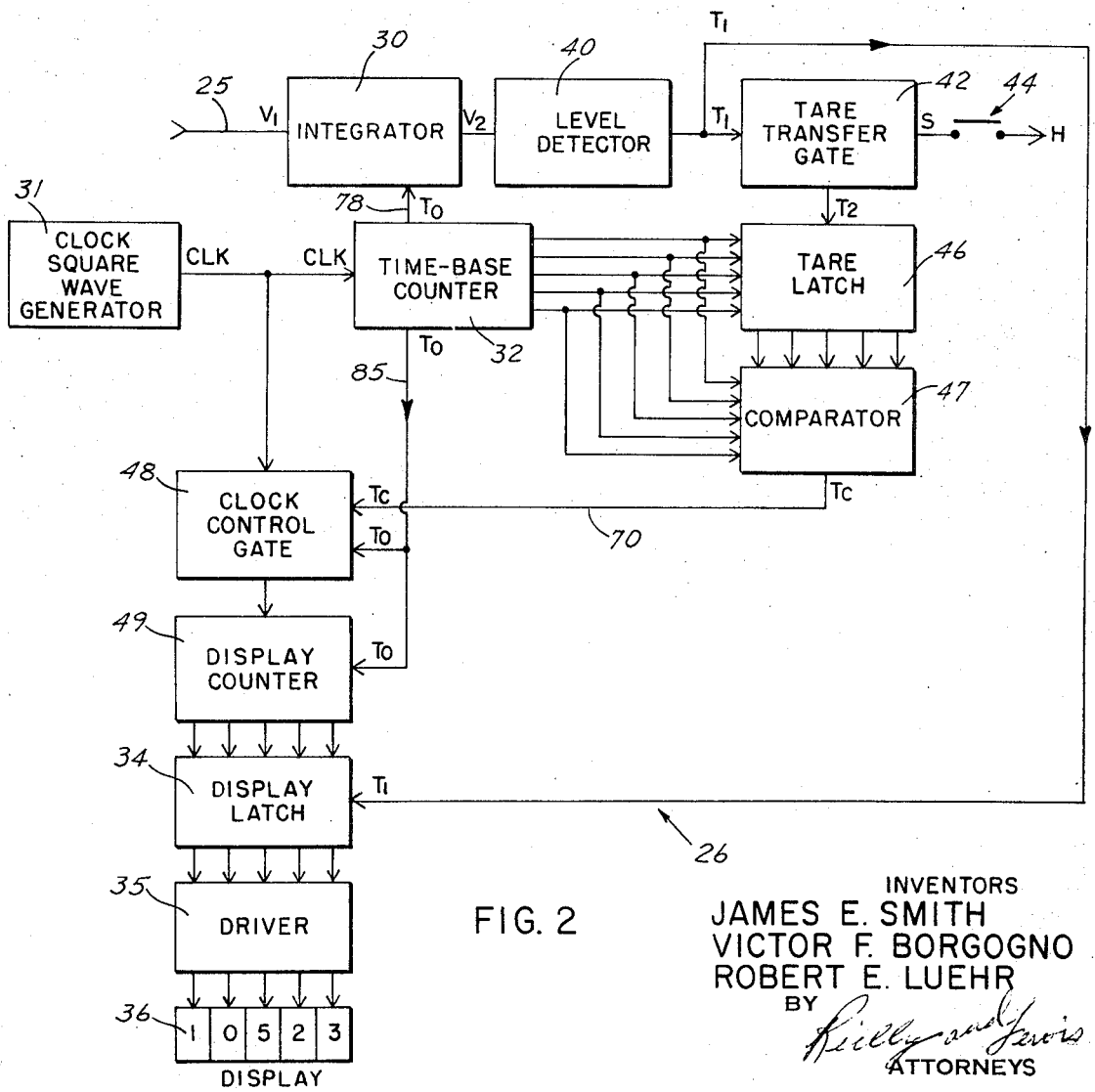
FIG. 2 is a block diagram of the digital voltage measuring apparatus of FIG. 1.

Referring to the novel and improved from of automatical tare compensating circuit illustrated in FIG. 2, the elements common to those forming a part of the conventional digital voltmeter circuit include the integrator circuit represented at 30 to which the voltage $V_1$ is applied across terminal 25, a clock 31 which generates timing pulses, designated CLK, applied to time-base counter 32, a display latch represented at 34, driver circuit 35 and a "Nixie" tube display represented at 36. Broadly, in order to compensate for or to deduct automatically values or signals applied to the integrator circuit in the manner described, the voltage $V_1$ which is integrated with respect to time by the integrator circuit is applied to a voltage level detector 40 which in turn generates a pulse $T_1$, representing the end of the time interval measured by the integrator circuit, and applies this pulse to tare transfer gate 42. A manually operated switch 44, also referred to as the tare control button, is operative when closed to apply a load signal S indicating a logic high to open the normally closed tare transfer gate 42. The tare transfer gate 42 is enabled by the simultaneous application of a load signal by closure of the tare control button 44 and application of a pulse $T_1$ from the level detector to apply a transfer or load pulse $T_2$ to a tare latch or storage register 46 in order to activate the latch 46 to read in and store the count contained on the time base counter 32. In turn, the comparator circuit 47 is connected both to the counter 32 and latch 46 in order to compare the count contained on the counter with that stored in the latch 46 and, when the counts are equal, will generate a pulse $T_c$ which is applied to clock control gate 48.

It will be seen that timing pulse CLK are applied by the clock 31 both to the time base counter 32 and to the clock control gate 48. As previously described in relation to the conventional digital voltmeter circuit, the clock circuit 31 generates timing pulses designated CLK which are applied to the time base counter 32, and in the circuit diagram shown in FIG. 2 are simultaneously applied to the clock control gate 48. The time-base counter 32 generates a control pulse $T_o$ at the beginning of each measurement cycle which is applied simultaneously to the integrator circuit 30 and to the clock control gate 48 in order to reset the control gate 48 at the commencement of each measurement cycle and disable the gate from transmitting the timing pulsing received from the clock circuit until a comparator pulse $T_c$ is transmitted from the comparator 47 to the clock control gate 48 indicating that the counts in the time base counter 32 equal those in the tare latch 46. Thereafter, the timing pulses from the clock circuit are transmitted through the clock control gate to the display counter 49 which serves to count the additional pulses received through to the end of each measurement cycle. In this relation, it will be seen also that the display counter 49 is reset to zero at the commencement of each measurement cycle by application of a counter pulse $T_o$ from the time-base counter 32.

At the end of each measurement cycle, the transfer pulse $T_1$ generated by the level detector 40 is applied both to the tare transfer gate 42 and to the display latch circuit 34. The display latch circuit 34 is enabled by the pulse $T_1$ to read in and to store in a conventional manner the count in the display counter 49; and the driver 35 is connected between the display latch 34 and the "Nixie" display 36 for the purpose of driving the display 36 in accordance with the count or digital information stored in the display latch 34. Thus through the cooperative use of the comparator circuit 47 with the display counter 49 under the control of the clock control gate 48, the display counter will count only those timing pulses within each measurement cycle received after the timing pulses loaded into the time-base counter equal those stored in the tare latch, the latter representing the tare value or weight of the matter on the balance beam.

Considering in more detail the individual elements comprising the preferred form of circuit shown in FIG. 2, the integrator may suitably take the form of an integrated circuit operational amplifier with matched field effect transistors connected as source followers on the input in order to provide high input impedance and to make the input offset current negligible. The level detector 40 comprises a plurality of transistors interconnected to function as a high gain level detector and specifically to deliver a positive feedback to the integrator when the reference voltage level is attained.

Again the clock circuit 31 is of a conventional type which generates a uniform square wave at a predetermined frequency, such as, 180k hertz.

Figure 3:
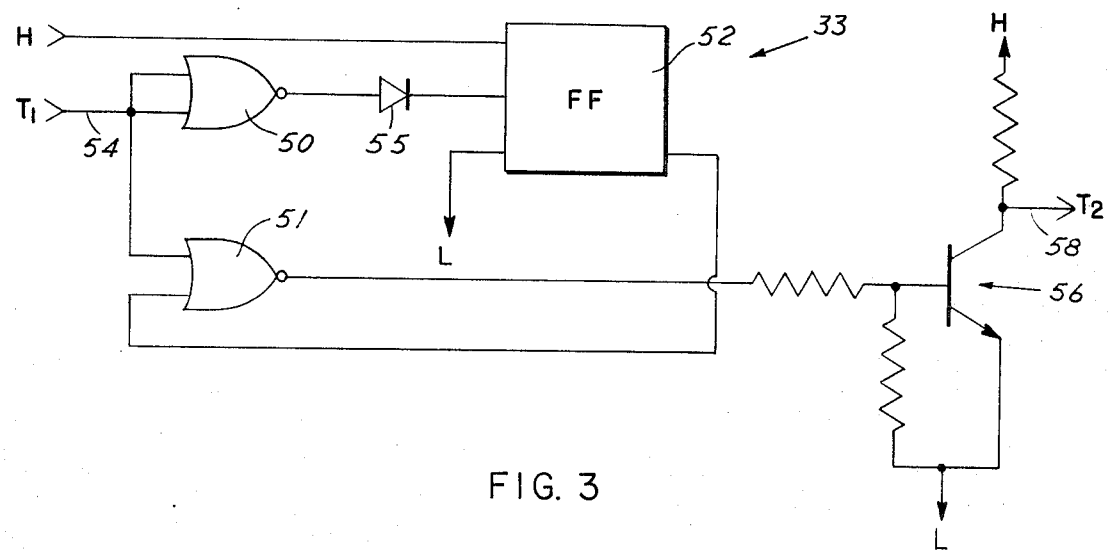
FIG. 3 is a circuit diagram of the transfer gate of FIG. 2.

As mentioned in relation to FIG. 2, the transfer gate 42 functions to generate the transfer or load pulse $T_2$ transmitted to the tare latch 46, the latter functioning as a storage register to read in and store the count in the main counter 32. As illustrated in FIG. 3, when the switch 44 is closed to transmit a load signal to one input of the FF 52, the gate 50 generates a logic high output wherever a pulse $T_1$ is received at terminal 54, since both inputs to the gate 50 are then logic lows. The logic high output of the gate 50 is applied through diode 55 to toggle the FF 52 to produce a logic low output which is transmitted to one input of the gate 51. Since the other input of the gate 51 has the logic low pulse $T_1$ therein, the gate 51 generates a logic high output which defines the transfer pulse $T_2$ transmitted by the transistor 56 over the output line 58 to activate the tare latch 46.

It is noted that while the load signal S from the switch 44 and the pulse $T_1$ must be generated simultaneously in order to produce the pulse $T_2$, the pulse $T_1$ controls the time interval of generation of the pulse $T_2$. As a result, a count is read from the counter 32 only when the integrator 30 is generating a pulse $T_1$. Since the pulse $T_1$ signals the end of the interval $T_o-T_1$ which is proportional to the magnitude of the analog signal V being measured, it therefore follows that the count read into the latch 46 is proportional to the value of analog signal V just measured. Thus, by closing the switch 44 and holding it closed for at least one measuring cycle to insure that a pulse $T_1$ is generated while the signal S is present, the comparator latch 46 is activated to read in a count from the counter 32 representing the time interval $T_o-T_1$ indicating the value of the last analog signal V measured.

Figure 4:
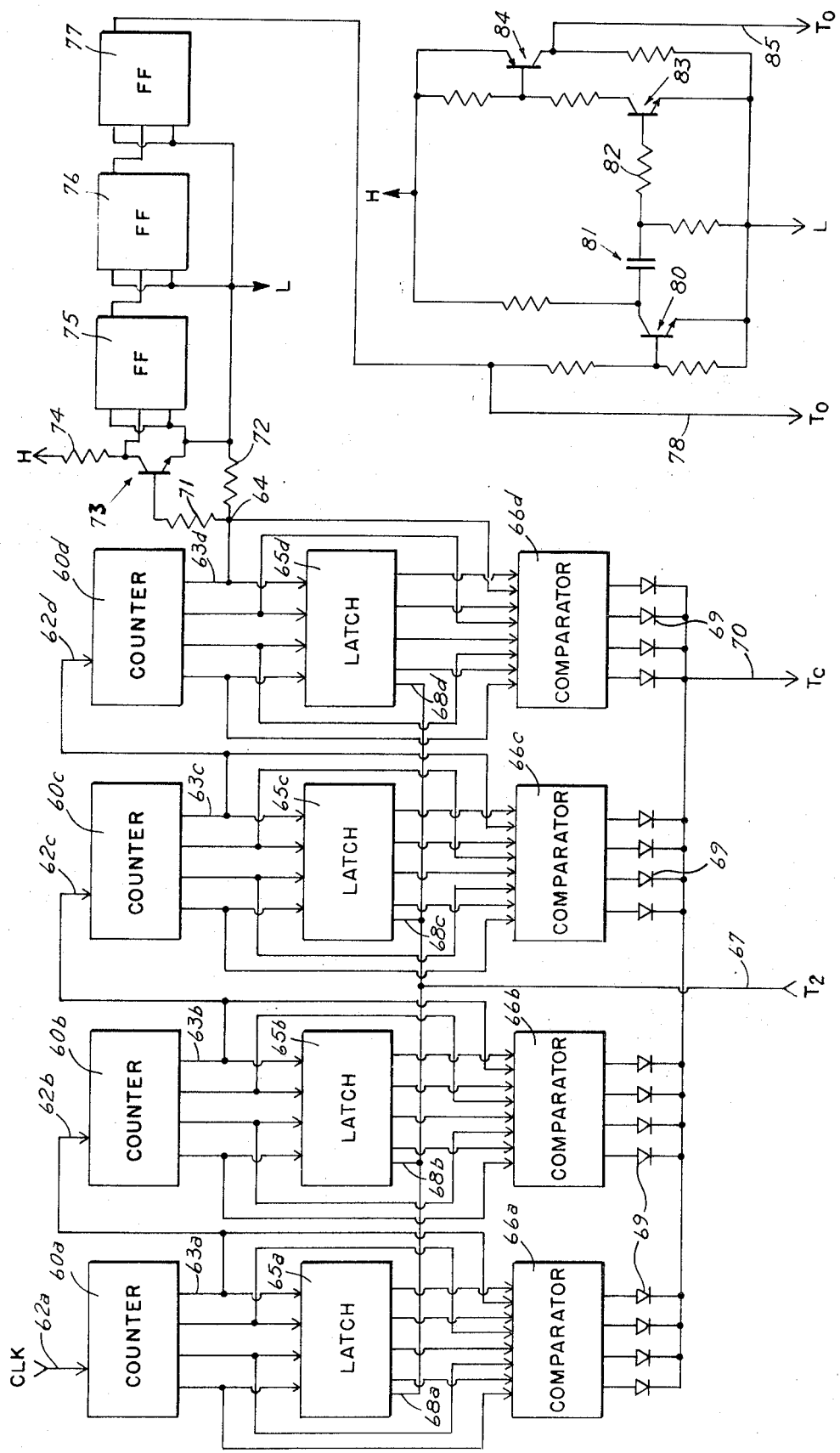
FIG. 4 is a circuit diagram of the main counter, tare latch and comparator of FIG. 2.

As shown in FIG. 4, preferably the time-base counter 32 is comprised of decade counters 60a–60d each of which may be suitably composed of four cascaded, binary triggered flip-flops modified by a feedback loop to count in a BCD 1-2-4-8 mode, and the counters have, respectively, inputs 62a–62d and outputs 63a–63d. The inputs 62a applies timing pulses from the clock circuit 31, and the outputs 63a to 63d are connected to the inputs 62b–62d of each next counter in succession with the output 63d connected to a junction point 64. The digital outputs 63a–63d are further connected to the inputs of the tare latch circuit 46 which comprises a plurality of buffer storage units 65a–65d, respectively. Each of the buffer storage units may suitably consist of four gated-latch circuits with a common gate driver. In addition, the outputs 63a–63d are connected as shown to the inputs of the comparator circuit 48 consisting of quadruple two-input exclusive-OR gates 66a–66d; and the outputs of the latches 65a to 65d are similarly connected to the comparator circuit 66a–66d.

The pulse $T_2$ from the tare transfer gate 42 is delivered over common input line 67 to control terminals 68a–68d of the latch circuits. The outputs of the comparator circuits are in turn connected in parallel through appropriately biased diodes represented at 69 for transmission of a pulse $T_c$ over output line 70.

The junction point 64 is common to one end of resistors 71 and 72, and the opposite ends of the resistors are connected to the base and emitter leads of the transistor 73. Logic high and low DC voltages are applied respectively through resistor 74 to the collector side of the transistor and directly to the emitter side of the transistor 73. Each of the flip-flops 75, 76 and 77 has its inputs connected to the logic low voltage as represented at L and each is toggle-connected to the collector side of the transistor 73, one output of each of the flip-flops 75 and 76. The output of flip-flop 77 is connected to output line 78 for transmission of a pulse $T_o$ from the time-base counter to the integrator circuit and to the base of the transistor 80. The collector lead of transistor 80 is in turn connected through a DC blocking capacitor 81 and resistor 82 to the base of transistor 83. In turn the collector lead of the transistor 83 feeds the base of a common collector connected transistor 84, the collector side of which is connected to output line 85 over which the pulse $T_o$ is applied to the clock control gate circuit 48 and display counter circuit 49. In the operation of the circuitry shown in FIG. 4, a continuous uniform count is generated by the counters 60 in response to timing pulses received from the clock circuit. The counters 60 are serially connected and the count generated is continuously presented to the inputs of the latches 65 and the comparators 66. The latches 65 only load and store the counts whenever the pulse $T_2$ is received at the control terminal 68; and the comparators 66 read in the count from the outputs of the latches 65, compare with the count from the counters 60, then generate a pulse $T_c$ as an output whenever the counts received from the counters exactly correspond with the counts loaded in from the latches.

Once the counters 60 have serially counted an entire count cycle, a count pulse is generated on output 64 which is transmitted by the transistor 73 to toggle the flip-flop 75. Flip-flops 75–77 are serially connected to count a predetermined number of counts which represent count cycles of the serially connected counters, such as, three count pulses, and thereafter generate an output pulse over the output of the flip-flop 77 to indicate the commencement of a new measurement cycle. The output pulse of the flip-flop 77 is the common pulse from which the pulses $T_o$ are derived and transmitted to the integrator circuit, clock control gate and display counter circuit as illustrated to signal the start of a new measurement cycle of the apparatus.

For the purpose of illustration, in an apparatus constructed in accordance with the present invention, where the duration of each measurement cycle was on the order of one-third second, the following integrated circuit components were used in the circuitry of FIG. 4: Fairchild CuL 9958 decade counter for the counter 60a–60d; Fairchild CuL 9959 buffer storage elements for the latches 65a–65d; and Fairchild circuit types SN7486 for the comparators 66a–66d. The gates, flip-flops and other circuit components hereinbefore and hereinafter described were supplied with power and bias voltages as required for their operation.

Figure 5:
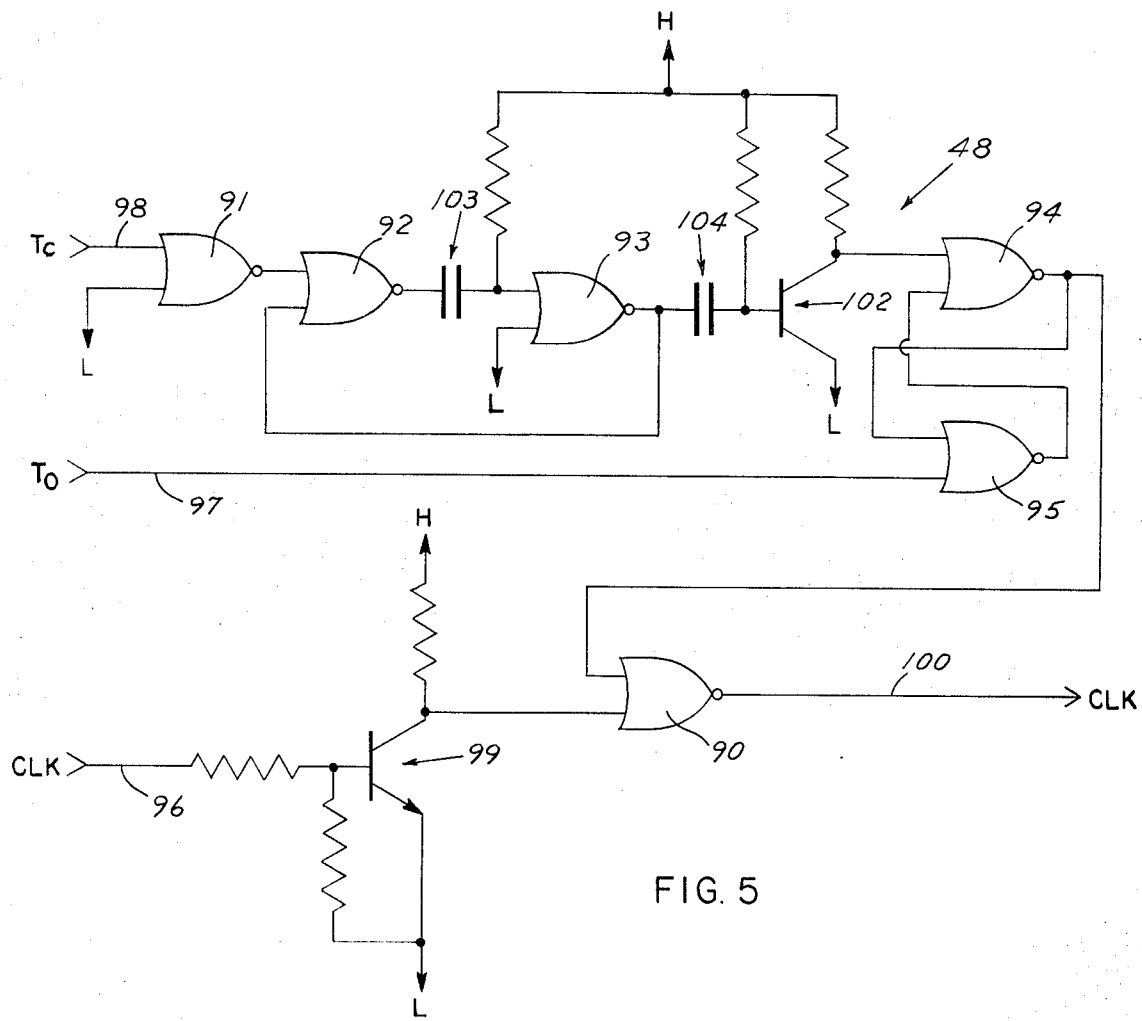
FIG. 5 is a circuit diagram of the control gate of FIG. 2.

Shown in FIG. 5 is the control gate 48 having OR gates 90–95 interconnected as shown. The clock 31 is connected to the input terminal 96 to supply CLK pulses thereto, the gating circuit 48 then functions basically to control the transmission of CLK pulses from input 96 to the output line 100. At the commencement of a measuring cycle, the input 97 receives the reset pulse $T_o$ from the main counter 32 which is at a logic high and is transmitted to one input of the gate 95. The logic high $T_o$ generates a logic low on the output of the gate 95 which is transmitted to one input of the gate 94. Since the transistor 102 is normally conductive, the logic low is also supplied to the other input of the gate 94. Thus with two low inputs, the gate 94 generates a logic high output which is transmitted to the gate 95 to lock a logic low output on the gate 95.

The logic high on the output of the gate 94 is also transmitted to one input of the gate 90. The other input of the gate 90 receives the CLK signal received on the input 96 and transmitted by the transistor 99. The CLK signal appears on the input of the gate 90 in the form of a uniform square wave which periodically alternates between logic high and logic low. The output of the gate 90 is, however, locked at a logic low by the high supplied from the output of the gate 94. Therefore, the CLK input to the gate 90 has no effect on the output of the gate 90 and no CLK signal is generated on the output terminal 100 as long as a logic high is locked on one input of the gate 90.

Upon receipt of the pulse $T_c$ from the comparator 47, the control gate is enabled to generate a CLK signal on its output 100. The pulse $T_c$ is a logic high and is transmitted to one input of the gate 91 and a logic low pulse is generated on the output of the gate 91 which is transmitted to one input of the gate 92. The other input of the gate 92 normally receives a logic low from the output of the gate 93 so that the logic low from the output of the gate 91 causes the gate 92 to generate a logic high pulse on its output. This logic high pulse appears on one side of the capacitor 103, thereby to cause a logic low pulse to appear on the input of the gate 93 from the capacitor 103. With logic lows on both inputs of the gate 93, a logic high output is generated which is coupled through the capacitor 104 to the base of the transistor 102. The logic low pulse on the output of the gate 93 causes the transistor 102 to momentarily become non-conductive so that a logic high pulse is transmitted from the collector lead of the transistor 102 to one input of the gate 94.

The input of a logic high to the gate 94 causes the gate output to go low. This logic low is transmitted from the output of the gate 94 to one input of the gate 90 and with a logic low now on the one input of the gate 90, the output of the gate 94 then changes in response to the CLK signal received on its other input. Thus, a CLK signal is generated on the output terminal 100 and is transmitted therefrom to the display counter 49.

Figure 6:
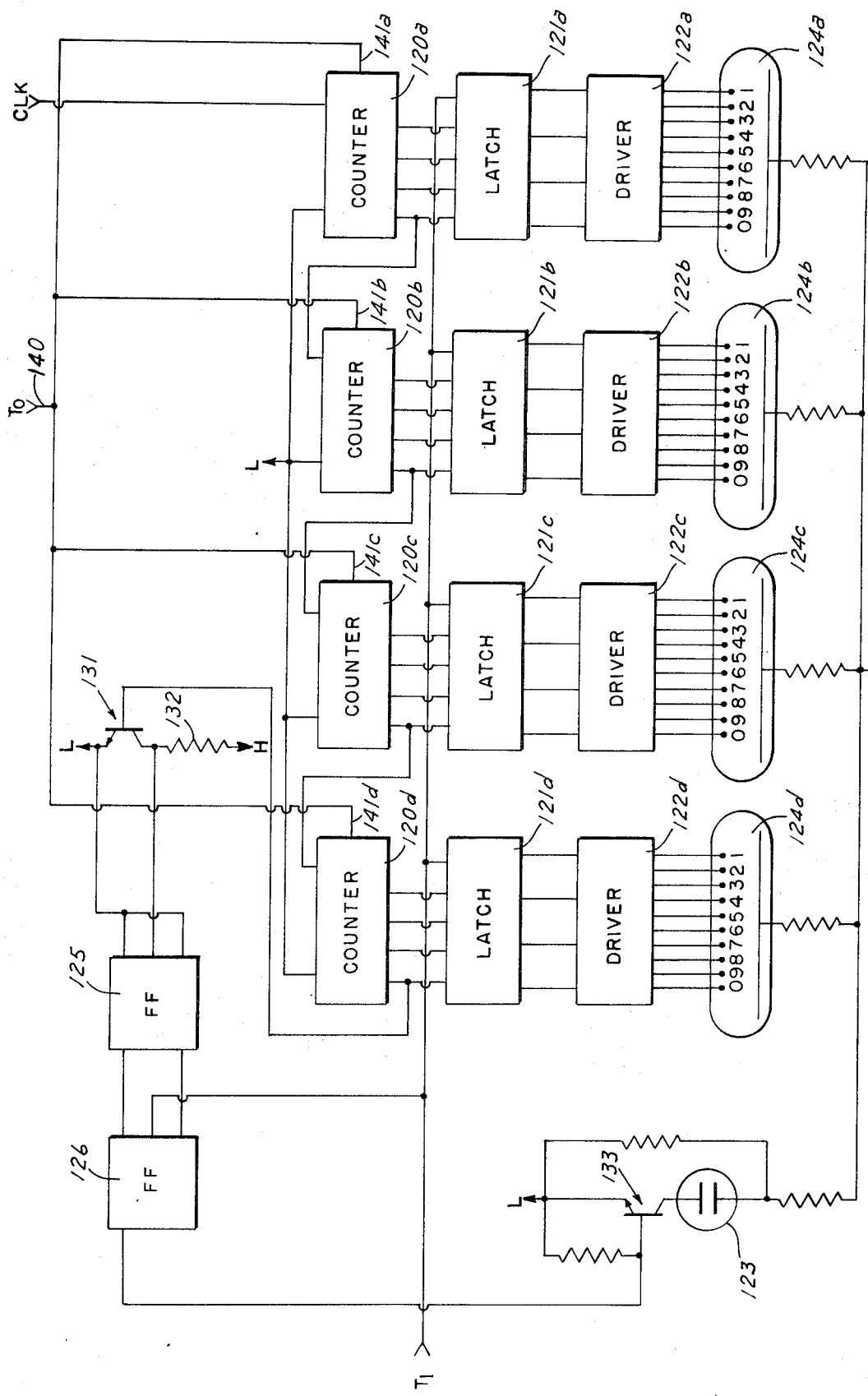
FIG. 6 is a circuit diagram of the display counter, display latch, driver and display of FIG. 2.

The circuitry shown in FIG. 6 operates in a conventional manner to count the timing pulses transmitted by the control gate 48 and to transfer and display the count of these pulses at the time the pulse $T_1$ is generated. The counters $120a$–$120d$ along the the flip-flops 125 and 126 make up the display counter 49. The counters $120a$–$120d$ are serially connected to count the timing pulses and transmit a count pulse to the toggle of FF 125 once each count cycle of the counters $120a$–$120d$. The outputs of the FF 125 are connected to the inputs of the FF 126 to shift the count pulses on the toggle of the FF 125 to the inputs of the FF 126.

The counts of the counters $120a$–$120d$ and the digit on the input of the FF 126 are loaded in and stored in the latches $121a$–$121d$ of the display latch circuit 34, and shifted to the output of the FF 126, respectively, at the instant a transfer pulse $T_o$ is received. The drivers $122a$–$122d$ decode the digits represented by each of the counts stored in the latches $121a$–$121d$, respectively, and display these digits on the indicator tubes $124a$–$124d$. The digit, either a zero or a one, on the output of the FF 126 is read by the transistor 133, and the transistor 133 drives the display tube 123 to display this digit. In this manner any five digit decimal number between 00000 and 19999 may be displayed. Specifically, the indicator tubes $124a$–$124d$ and 123 make up the display means 36; the drivers $122a$–$122d$ along with the transistor 133 make up the driver 35 for the display means 36; and the latches $121a$–$121c$ with the FF 126 make up the display latch 34. At the commencement of each measuring cycle the counters $120a$–$120d$ are reset to zero by the pulse $T_o$ received at the input terminal 110 and transmitted to the counter terminals $141a$–$141d$. It is noted that the last count transferred into the display latch 34 remains displayed on the indicator tubes $124a$–$124d$ and 123 until the next transfer pulse $T_1$ is received to transfer a new count into the display latch 34.

In apparatus constructed in accordance with the present invention, the following integrated circuit components were in the circuitry shown in FIG. 7: Fairchild CuL 9958 decade counters provided the counters $120a$–$120d$; Fairchild CuL 9959 buffer storage elements served as the latches $121a$–$121d$; and Fairchild CuL 9960 decimal decoder/drivers were employed to drive the "Nixie" display $122a$–$122d$.

The overall operation of the digital balance 10 and the digital measuring apparatus 26 is here explained: Assuming that the apparatus is an energized state, the button or switch 44 may be closed for a brief interval prior to placing the weight on the balance pan 15, the effect of which is to set the readout of the display means 36 to zero, thereby to restore the digital balance 10 and to correct for any errors which may have resulted from mechanical or electrical system drift. For example, the balance beam 11 may have drifted slightly away from its balanced position so as to cause a false output on the reference resistor 24, or a false electrical signal will have been generated on the reference resistor 21. Closure of the switch 44 has the effect of zeroing the digital balance 10 and the measuring apparatus 26 since any false signal being sensed is read in and stored in the comparator latch 47 at the instant the integrator 20 generates a $T_1$ pulse in a measuring cycle during which the switch 44 is closed.

In order to make a typical measurement, for the purpose of illustration, in FIG. 1 a beaker 300 having graduations 301 and 302 is used for weighing liquids. The beaker 300 is first placed empty on the pan 15, and the weight of the beaker 300 on the beam 11 is reflected by a change in capacitance between plates 18, 19 and 20. This capacitance change is converted into a linear DC current signal by the balance restoring circuit 22. For example, a balance restoring circuit such as that shown in Blethen et al, U.S. Pat. application Ser. No. 850,397, filed Aug., 1969, may define the circuit 22. Here, the linear current signal generated by the circuit 22 flows through the reference resistor 24 to generate a DC voltage signal proportional to the weight of the beaker 300. Further, the current generated by the circuit 22 energizes the forcer coil 17 to magnetically force the beam 11 back to its balance or null position.

The voltage V which appears across the resistor 24 represents the empty weight of the beaker 300 plus any zero drift signal previously corrected for. This voltage V is integrated by the integrator 30 and generates a time interval proportional to the magnitude of the voltage V. The integration of the voltage V commences at the start of a measuring cycle when the main counter 32, which is continuously counting the pulses CLK, generates the pulse $T_o$. The pulse $T_o$ commences the operation of the integrator 30 and closes the control gate 48 and resets the display counter 49 to zero. With the control gate 48 closed, no timing pulses CLK are transmitted to the display counter 49.

As before described, the integrator 30 generates a time interval proportional to the voltage V which time interval is measured by the pulses $T_o$ and $T_1$ generated at the beginning and end of the measuring cycle. During each measurement cycle, the count of the counter 32 is transmitted continuously to the comparator 47, which compares the count of the counter 32 with the error or drift count previously stored in the latch 46 and, when these two counts are equal, delivers the pulse $T_c$ to the control gate 48. The pulse $T_c$ opens the control gate 48 so that CLK pulses are transmitted from the counter 32 to the display counter 48. The counter 49 then counts these pulses until the integrator 30 generates pulse $T_1$. The generation of the pulse $T_1$ indicates that a time interval has now been generated proportional to the voltage V.

At the instant the pulse $T_1$ is generated, the digital count in the display counter 49 represents only that portion of the voltage V which is due to the weight of the empty beaker 300. It is noted that while any prior error voltage, such as zero drift, appearing on the resistor 24 does alter the length of the time interval $T_o$ generated by the integrator 30, the apparatus 26 had been zeroed by actuating the switch 44 just prior to weighing the beaker 300, and the action of the comparator 47 in comparing the count value of the drift error stored in the latch 46 with the count of the counter 32 causes the display counter 37 only to count CLK pulses after the value of this drift error has been deducted. Accordingly, the digital count in the display counter 49 at the time $T_1$ is only proportional to the weight of the beaker 300.

The count on the display counter 49 is continuously presented to the inputs of the display latch 34. The latch 34 receives the pulse $T_1$ generated by the integrator 30 and in response thereto reads in and stores the count in the counter 49 which represents the weight of the beaker 300. The count stored in the latch 34 is decoded by the driver 35, and the driver 35 drives the display means 36 to present a digital readout representative of the weight of the beaker 300.

Consider now that it is desirable to pour a liquid A into the beaker 300 up to the graduation mark 301 and read out the net weight of this liquid A. The switch 44 is first closed with the beaker 300 still empty on the pan 15. As a result of closing the switch 44, the pulse T2 is generated by the transfer gate 42 on the next generation of the pulse $T_1$ and the comparator latch 47 reads in and stores all the tare now present on the digital balance 10. Although the main counter 32 continues to count CLK pulses and generates pulses $T_o$ to commence new measuring cycles, the display means 36 will continue to read out zero until additional weight is added to the balance pan 15, since the weight on the pan 15 and any prior measured zero drift is now stored in the comparator latch 46. Thus, the comparator 47 will not generate the pulse $T_c$ until the same instant that the pulse $T_1$ is generated by the integrator 30 to enable the control gate 48. Until the gate 48 is enabled, no pulses are transmitted to the counter 49 and since the counter 49 reads zero, zero count is read into the latch 34 and is displayed by the display means 36.

The liquid A, the weight of which is being measured, may now be added to the beaker 30 to fill the beaker 300 up to the graduation 301. The DC voltage V now generated across the reference resistor 24 is proportional to the sum of the weight of the liquid A, the beaker 300 and any drift error. Upon receipt of a pulse $T_o$, the integrator 30 generates a time interval proportional to the total voltage V. The comparator 47, however, only generates a pulse $T_c$ when the count of the counter 32 equals the count stored in the latch 46. Since the count stored in the latch 46 represents that part of the time interval due to drift voltage and the weight of the beaker 300, the subsequent count of the display counter of CLK pulses generated after the time of the pulse $T_c$ represents only that part of the voltage V proportional to the weight of the liquid A. Thus, the count transferred into the latch 34 by the pulse $T_1$ and displayed by the display means 36 only indicates the net weight of the liquid A.

Should it now be desired to add a second liquid B to the beaker 30 up to the graduation 302 and measure the weight of this liquid B, the abovedescribed procedure may be repeated. First, all tare is deducted by closing the switch 44 through one measuring cycle. In that way, the count represented as the weight of liquid A, the weight of the beaker 300 and the zero drift voltage may be stored in the comparator latch 36. The liquid B then may be added to the beaker 300 and the display means 36 thereafter reads out the net weight of the liquid B added.

Thus, there has been provided improved measuring apparatus of the type capable of converting an analog signal, such as weight and current, into an analog voltage signal and then converting the voltage signal into digital information. Further, the apparatus is capable of deducting the value of selected prior output signals which have been measured or sensed from subsequent digital readouts. It is noted, within the spirit of the present invention, that the apparatus may be used, as described, to provide a tare deducting digital balance, or may be adapted for use as a digital voltmeter which may be simply and accurately zeroed at any selected instant, or further may be adapted for use with various detector means which detect analog signals and convert them into voltage signals.

It is therefore to be understood that the foregoing description of a preferred embodiment of the present invention only, and it will be apparent to those skilled in the art that various changes and modifications may be made therein without departing from the invention.

What is claimed is:

1. In analog-to-digital measuring apparatus for measuring the value of each of a series of electrical signals having clock means generating a series of uniformly spaced timing pulses, first counter means connected to said clock means for periodically counting the timing pulses from zero to a predetermined count, the first counter means being operable to generate a first pulse at the commencement of each of its count cycles, and integration means responsive to the first pulse in each cycle to integrate with respect to time the magnitude of an electrical signal applied thereto, said integration means being operative to generate a second pulse a predetermined time interval after the generation of the first pulse where-in the time interval is proportional to the magnitude of each electrical signal to be measured, the combination therewith of first storage means selectively operative in response to receiving the second pulse in each cycle from the integrator means to read in and store the count on said first counter means at the instant the second pulse is generated;

comparator means connected to the first counter means and said first storage means for comparing the count on the first counter means with the count stored in said first storage means, said comparator means being operative to generate a third pulse whenever the count on the first counter means equals the count stored in said first storage means;

second counter means being reset to zero in response to the generation of a first pulse and for counting only in response to a third pulse the additional counts in a next cycle of the integrated value of an electrical signal in excess of the value of a preceding signal measured by said integration means, and second storage means responsive to the second pulse in each cycle for reading in and storing the count on said second counter means at the instant the second pulse is generated.

2. The invention recited in claim 1, including display means connected to said second storage means for displaying the count stored in said second storage means in each cycle.

3. The invention recited in claim 1, including:
display means for indicating a decimal numeral; and
driver means interconnected between said second storage means and said display means for decoding the count in said second storage means and driving said display means to indicate as a decimal numeral the count in said second storage means.

4. The invention recited in claim 1, wherein said integrator means is responsive to the first pulse in each cycle for generating an electrical output signal a time interval after the generation of said first pulse which is proportional to the magnitude of an electrical signal received by said integrator means; and circuit means connected to said integrator means for generating the second pulse whenever the electrical output signal is generated by said integrator means.

5. The invention recited in claim 1 wherein said integrator means is operative to receive an electrical voltage signal; and including analog signal measuring means connected to the integrator means for converting an analog signal sensed to an electrical voltage signal and transmitting the voltage signal to said integrator means.

6. The invention recited in claim 5, wherein the time interval between the first and second pulses is proportional to the magnitude of a DC voltage signal being received by said integrator means, and said analog signal measuring means is operable to convert an analog signal sensed into a DC voltage signal.

7. The invention recited in claim 1 wherein the second counter means includes:
a counter circuit, said counter circuit being operable to count and receive ones of said clock pulses and responsive to said first pulse to reset its count to zero; and
a control gate responsive to said third and first pulses and connected between said clock means and said counter circuit to control the transmission of clock pulses from said clock means to said counter circuit, said control gate being operable to transmit clock pulses from said clock means to said counter circuit during the time interval measured from the instant of generation of the third pulse to the instant of generation of the first pulse.

8. The invention recited in claim 1, including selectively operable switch means for generating a load signal;
gate means responsive to the second pulse and the load signal for generating a load pulse whenever the second pulse and the load signal are simultaneously generated; and
said first storage means connected to said first counter means and responsive to the load pulse to read in and store the count on the first counter means at the instant the load pulse is generated.

9. Weight measuring apparatus, comprising:
means for weighing an object and generating an electrical signal proportional to the weight of an object being weighed;
clock means for generating a time signal of uniformly spaced clock pulses;
first counter means connected to said clock means for periodically counting said cock pulses from zero to a predetermined count, said first counter means being operable to generate a first pulse at the commencement of each of its count cycles;
means associated with said first counter means responsive to said first pulse for generating a time interval proportional to the magnitude of the electrical signal representing weight being generated by said weighing means, said time interval generating means being operable to generate a second pulse to indicate the end of said time interval whereby said time interval is measured by the period of time from the generation of said first pulse to the generation of said second pulse;
selectively operable first storage means connected to said first counter means and responsive to second pulse, said first storage means being operable upon selective actuation to read in and store the count on said first counter means at the instant said second pulse is generated; comparator means connected to said first counter means and said first storage means for comparing the count on said first counter means with the count stored in said first storage means, said comparator means being operable to generate a third pulse whenever the count on said first counter means equals the count stored in said first storage means;

second counter means connected to said clock means and responsive to said first and third pulses for resetting its count to zero in response to said third and first pulses, said clock pulses generating during the time interval measured from the instant of generation of said third pulse to the instant of generation of said first pulse;

second storage means connected to said second counter means and responsive to said second pulse for reading in and storing the count on said second counter means at the instant said second pulse is generated; and display means connected to said second storage means for displaying the count stored in said second storage means.

10. The invention recited in claim 9 wherein:

said time interval generating means includes integrator means connected to said weighing means and circuit means connected to said integrator means for generating said second pulse, said integrator means being operable in response to said first pulse to generate an electrical output signal a time period after the generation of said first pulse proportional to the magnitude of the electrical signal representing the weight being generated by said weighing means, said circuit means being operable to generate said second pulse whenever said predetermined electrical output signal is generated by said integrator means;

said selectively operable first storage means includes switch means, gate means and a storage register connected to said first counter means, said switch means being selectively operable to generate a load signal, said gate means being responsive to said second pulse and said load signal to generate a load pulse whenever said second pulse and said load signal are simultaneously generated, said storage register being operable in response to said load pulse to read in and store the count on said first counter means at the instant said load pulse is generated; and said second counter means includes a counter circuit and a control gate connected between said clock means and said counter circuit to control the transmission of said clock pulses from said clock means to said counter circuit, said counter circuit being operable to count received ones of said clock pulses and responsive to said first pulse to reset its count to zero, said control gate being operable in response to said third and first pulses to transmit said clock pulses from said clock means to said counter circuit during the time interval measured from the instant of generation of said third pulse to the instant of generation of said first pulse.

11. The invention recited in claim 10 wherein:

said electrical signal proportional to the weight of an object being weighed which is generated by said weighing means is a DC voltage;

said integrator means is operable in response to said first pulse to generate said predetermined electrical output signal a time period after the generation of said first pulse proportional to the magnitude of the DC voltage representing weight being generated by said weighing means; and said display means is operable to indicate a decimal numeral and includes driver means for decoding the count in said second storage means into decimal digits whereby said display means indicates as a decimal number the count in said second storage means.

12. Measuring apparatus comprising:

means for receiving analog signals and periodically generating first digital counts, each of said first digital counts being proportional to the magnitude of the analog signal being received at the time each one of said digital counts was generated;

storage means for selectively storing any selected ones of said first digital counts generated; and means for generating and displaying a second digital count which is equal to the last generated one of said first digital counts less the count stored in said storage means.

13. The invention recited in claim 12 wherein said signal receiving means is operable to receive DC voltage signals.

14. The invention recited in claim 12, including means for converting an analog signal to be measured into a DC voltage signal proportional to the magnitude of the analog signal to be measured and for transmitting the DC voltage signal to said signal receiving means.

15. Measuring apparatus comprising:

signal receiving means for receiving a DC voltage signal to be measured;

clock means for generating a time signal of uniformly spaced clock pulses;

first counter means connected to said clock means for periodically counting said clock pulses from zero to a predetermined count, said first counter means being operable to generate a first pulse at the commencement of each of its count cycles;

integrator means connected to said signal receiving means and responsive to said first pulse for generating a time interval proportional to the magnitude of a DC voltage signal being received by said signal receiving means; said integrator being operable to generate a predetermined output signal to indicate the end of said time interval;

circuit means connected to said integrator means for generating a second pulse whenever said predetermined electrical output signal is generated by said integrator means;

selectively operable switch means for generating a load signal;

first gate means responsive to said second pulse and said load signal for generating a load pulse whenever said second pulse and said load signal are simultaneously generated;

first storage means connected to said first counter means and responsive to said load pulse for reading in and storing the count on said first counter means at the instant said load pulse is generated;

comparator means connected to said first counter means and said first storage means for comparing the count on said first counter means with the count stored in said first storage means, said comparator means being operable to generate a third pulse whenever the count on said first counter means equals the count stored in said first storage means;

second counter means for counting received ones of said clock pulses, said counter means being responsive to said first pulse to reset its count to zero;

second gate means connected between said clock means and said second counter means for controlling the transmission of said cock pulses from said clock means to said second counter means, said second gate means being responsive to said third and first pulses to transmit said clock pulses to said clock means during the time interval measured from the instant of generation of said third pulse to the instant of generation of said first pulse;

second storage means connected to said second counter means and responsive to said second pulse for reading in and storing the count on said second counter means at the instant said second pulse is generated;

driver means connected to said second storage means for decoding the count in said second storage means into decimal digits driving said digital display means; and digital display means connected to said driver means for displaying as a decimal numeral the count in said second storage means said driver means driving said digital display means.

* * * * *